(12) United States Patent
Andon

(10) Patent No.: US 8,393,298 B2
(45) Date of Patent: Mar. 12, 2013

(54) AQUARIUM WITH AIRLIFT-GENERATED ROTATING WATER FLOW, METHODS OF USE AND KITS THEREFOR

(75) Inventor: Alexander Urban Andon, San Francisco, CA (US)

(73) Assignee: Anyvivo, Inc., San Francisco, CA (US)

( * ) Notice: Subject to any disclaimer, the term of this patent is extended or adjusted under 35 U.S.C. 154(b) by 0 days.

(21) Appl. No.: 13/412,854

(22) Filed: Mar. 6, 2012

(65) Prior Publication Data
US 2012/0227673 A1 Sep. 13, 2012

Related U.S. Application Data

(60) Provisional application No. 61/464,435, filed on Mar. 7, 2011.

(51) Int. Cl.
*A01K 61/00* (2006.01)
(52) U.S. Cl. .......................... 119/245; 119/255; 119/269
(58) Field of Classification Search .................. 119/245, 119/247, 248, 251, 259, 266, 267, 255, 269
See application file for complete search history.

(56) References Cited

U.S. PATENT DOCUMENTS

| | | | |
|---|---|---|---|
| 2,744,065 A | 5/1956 | Lacey | |
| 3,288,110 A * | 11/1966 | Jerome Goldman et al. . | 119/248 |
| D244,553 S | 5/1977 | Robert | |
| D255,273 S | 6/1980 | Robert | |
| D255,274 S | 6/1980 | Robert | |
| D255,949 S | 7/1980 | Robert | |
| D255,950 S | 7/1980 | Robert | |
| D304,246 S | 10/1989 | Ross et al. | |
| 4,966,096 A | 10/1990 | Adey | |
| 5,090,357 A * | 2/1992 | Pucci | 119/256 |
| 5,172,650 A * | 12/1992 | Hsu et al. | 119/259 |
| 5,245,945 A * | 9/1993 | Liao | 119/248 |
| 5,282,438 A * | 2/1994 | McLaughlin | 119/248 |
| 5,306,421 A * | 4/1994 | Weinstein | 210/151 |
| D418,634 S | 1/2000 | Harmony | |
| 6,044,903 A | 4/2000 | Heilman | |
| 6,276,302 B1 * | 8/2001 | Lee | 119/260 |
| D449,717 S | 10/2001 | Fang | |
| D449,903 S | 10/2001 | Fang | |
| D449,904 S | 10/2001 | Fang | |
| D450,410 S | 11/2001 | Fang | |
| D451,249 S | 11/2001 | Fang | |
| 6,520,117 B1 * | 2/2003 | Wood | 119/246 |

(Continued)

OTHER PUBLICATIONS

Greve, W. The "Planktonkreisel", a New Device for Culturing Zooplankton. Marine Biol. 1, 201-203 (1968).
Hamner, William. Design Developments in the Planktonkreisel, a Plankton Aquarium for Ships at Sea. Journal of Plankton Research, vol. 12, No. 2 (1990) pp. 397-402.

*Primary Examiner* — Yvonne Abbott
(74) *Attorney, Agent, or Firm* — Greenberg Traurig LLP; Cicily Anne O'Regan

(57) ABSTRACT

An aquarium suitable for keeping, maintaining and displaying jellyfish is described. The aquarium has a container having a first and second exterior wall and a panel connecting the first and second exterior wall and defining an interior of the container, an interior wall having an upper and lower side, an upper and lower end, a first and second side, wherein the first side of the interior wall is connected to the first exterior wall of the container and the second side of the interior wall is connected to the second exterior wall of the container, and further wherein the interior wall is positioned parallel at least a portion of the panel along at least a side of the exterior wall to form a channel therebetween, an air pump positioned in communication with a lower end of the channel and a power supply.

14 Claims, 6 Drawing Sheets

U.S. PATENT DOCUMENTS

| | | |
|---|---|---|
| 6,641,732 B1 | 11/2003 | Cheyne |
| 7,029,577 B2 | 4/2006 | Cummins |
| D526,747 S | 8/2006 | Thomsen et al. |
| D531,763 S | 11/2006 | Waldeck |
| D542,980 S | 5/2007 | Scarrott |
| D548,406 S | 8/2007 | Mihlbauer |
| 7,610,878 B2 | 11/2009 | Stime, Jr. |
| 7,807,053 B2 * | 10/2010 | Smith ............... 210/167.22 |
| 7,832,358 B2 * | 11/2010 | Tsai ..................... 119/259 |
| 2007/0056523 A1 | 3/2007 | Stime |

* cited by examiner

AQUARIUM WITH AIRLIFT-GENERATED ROTATING WATER FLOW, METHODS OF USE AND KITS THEREFOR

CROSS-REFERENCE

This application claims the benefit of U.S. Provisional Application No. 61/464,435, filed Mar. 7, 2011, entitled Jellyfish Aquarium with Airlift-Generated Rotating Water Flow, which application is incorporated herein by reference.

This application is related to design application Ser. No. 29/407,020 filed Nov. 22, 2011, entitled Jelly Fish Tank Device.

BACKGROUND OF THE INVENTION

1. Field of the Invention

This disclosure relates to aquariums suitable for keeping, maintaining and displaying jellyfish.

2. Description of the Related Art

Jellyfish (colloquially referred to as "jellies" or "sea jellies") are free-swimming members of the phylum Cnidaria. The term jellyfish can also generally refer to members of the phylum Ctenophora. Although not closely related to cnidarian jellyfish, ctenophores are also free-swimming planktonic carnivores, are generally transparent or translucent, and exist in shallow to deep portions of all the world's oceans. Medusa is another word for jellyfish, and refers to any free-swimming jellyfish life stages among animals in the phylum.

Jellyfish have multiple morphologies that represent cnidarian classes including the Scyphozoa, Staurozoa, Cubozoa, and Hydrozoa that make jellyfish and many more that do not. Jellyfish are found in every ocean, from the surface to the deep sea. Jellyfish have roamed the seas for at least 500 million years, and possibly 700 million years or more, making them the oldest multi-organ animal.

*Aurelia aurita* (moon jelly, moon jellyfish, common jellyfish, saucer jelly) is one of a group of more than ten morphologically nearly identical jellyfish species in the class Scyphozoa, genus *Aurelia*. The medusa is translucent and it feeds by collecting medusae, plankton and mollusks with its mucusy bell nematocyst-laden tentacles and bringing the prey into its body for digestion, but is capable of only limited motion; like other jellies it primarily drifts with the current, even when it is swimming.

United States Patent Publication US 2007/0056523 entitled Aquarium for Jellyfish describes a Kreisel tank with an octagonal shape.

Greve, W., *The "planktonkreisel", a new device for culturing zooplankton*. Marine Biol. 1, 201-203 (1968) was the first publication to describe a tank capable of keeping delicate gelatinous marine animals in captivity. Before this, there was no tank design capable of having water plumbed in and out for filtration that would not suck up and damage gelatinous zooplankton.

Hamner, William. *Design developments in the planktonkreisel, a plankton aquarium for ships at sea*. Journal of Plankton Research, Vol. 12, No. 2 (1990) pp. 397-402, describes modifications to the original planktonkreisel design in order to make it more effective for certain research projects. William Hamner is responsible for perfecting the flow rates in kreisels along with David Powell and Paul Greeves.

U.S. Pat. No. 2,744,065 entitled Home Aquarium Circulator and Aerator describes a method of circulating and aerating water in a tank using an air lift pump. Air lift pumps have been used in many applications including those in aquarium products.

A kreisel tank (kreisel means spinning top) is a circular aquarium designed to hold delicate animals such as jellyfish. These aquariums provide slow, circular water flow with a minimum of interior hardware, to prevent delicate animals from becoming injured by pumps or the tank itself. Originally a German design, the kreisel tank is characterized by the fact that it has no sharp corners. Water moving into the tank gives a gentle flow that keeps the tank inhabitants suspended, and water leaving the tank is covered by a delicate screen that prevents the tank inhabitants from getting stuck. In a true kreisel, the circular tank has a circular, submerged lid. In a pseudokreisel tank, the tanks have a curved bottom surface and a flat top surface, similar to the shape of either a "U" or a semicircle. Stretch kreisels or Langmuir kreisels feature a "double gyre" kreisel design, where the tank length is at least twice the height. Using two downwelling inlets on both sides of the tank enables gravity create two gyres within the tank. A single downwelling inlet may be used in the middle as well. The top of a stretch kreisel may be open or closed with a lid. There may also be screens about midway down the sides of the tank, or at the top on the sides.

Because of its tranquil floating motion, the jellyfish are relaxing to watch. However, the delicate nature of their physiological shape and their relative inability to navigate make them difficult to maintain in a non-commercial artificial environment. What is needed is an aquarium that facilitates keeping, maintaining and displaying jellyfish which is adapted to provide a fluid flow process that is optimized for keeping the jellyfish suspended in the fluid given their relative inability to navigate.

SUMMARY OF THE INVENTION

An aspect of the disclosure is directed to an aquarium suitable for keeping and displaying jellyfish.

An aspect of the disclosure is directed to an aquarium. The aquarium comprises: a water container having a first exterior wall and a second exterior wall parallel the first exterior wall and a panel connecting the first exterior wall and the second exterior wall and defining an interior of the container; an interior wall having an upper side and a lower side, an upper end and a lower end, a first side and a second side, wherein the first side of the interior wall is connected to the first exterior wall of the container and the second side of the interior wall is connected to the second exterior wall of the container, and further wherein the interior wall is positioned parallel at least a portion of the panel along at least a side of the exterior wall to form a channel therebetween; an air pump positioned in communication with a lower end of the channel; and a power supply. Additionally, the aquarium can further include one or more of each of a light, a filter, a filter media, a temperature control device, a thermometer, a heater, a cooler, a base, and a lid. Additionally, the shape of the aquarium in two dimensions can be round, oval, ovoid and elliptical.

Another aspect of the disclosure is directed to a method for housing sea life. The method comprises: placing a selected living organism in a water container having a first exterior wall and a second exterior wall parallel the first exterior wall and a panel connecting the first exterior wall and the second exterior wall and defining an interior of the container, an interior wall having an upper side and a lower side, an upper end and a lower end, a first side and a second side, wherein the first side of the interior wall is connected to the first exterior wall of the container and the second side of the interior wall is connected to the second exterior wall of the container, and further wherein the interior wall is positioned parallel at least a portion of the panel along at least a side of the exterior wall to form a channel therebetween, an air pump positioned in communication with a lower end of the channel and a power supply; activating the air pump; generating a fluid flow within the channel at a first end of the channel that exits a second end of the channel; creating a laminar fluid flow of the fluid which maintains the sea life in a suspend position within the fluid. Additional steps can include one or more of each of activating a light to illuminate the interior of the container; heating or cooling the fluid within the container; filtering the fluid through at least one of a filter and a filter media.

Still another aspect of the disclosure is directed to a kit comprising one or more of the following: a water container having a first exterior wall and a second exterior wall parallel the first exterior wall and a panel connecting the first exterior wall and the second exterior wall and defining an interior of the container, an interior wall having an upper side and a lower side, an upper end and a lower end, a first side and a second side, wherein the first side of the interior wall is connected to the first exterior wall of the container and the second side of the interior wall is connected to the second exterior wall of the container, and further wherein the interior wall is positioned parallel at least a portion of the panel along at least a side of the exterior wall to form a channel therebetween, an air pump positioned in communication with a lower end of the channel and a power supply; one or more lights; one or more colored filters; one or more filters; one or more filter media; one or more temperature controlling devices.

INCORPORATION BY REFERENCE

All publications, patents, and patent applications mentioned in this specification are herein incorporated by reference to the same extent as if each individual publication, patent, or patent application was specifically and individually indicated to be incorporated by reference.

Additional publications that may be useful in reviewing this disclosure include, for example, U.S. Pat. No. 2,744,065 to Lacey issued May 1, 1956, entitled Home Aquarium Circulator and Aerator; and US 2007/0056523 A1 to Stime Jr., published Mar. 15, 2007, entitled Aquarium for Jellyfish, now U.S. Pat. No. 7,610,878 B2; U.S. Pat. No. 4,966,096 to Adey, issued Oct. 30, 1990, entitled Water Purification System and Apparatus; U.S. Pat. No. 6,044,903 to Heilman et al., issued Apr. 4, 2000, entitled Water Conditioning Assembly; U.S. Pat. No. 6,641,732 B1 to Cheyne, issued Nov. 4, 2003, entitled Cross-Flow Tank System for Aquatic Life; and U.S. Pat. No. 7,029,577 B2 to Cummins, issued Apr. 18, 2006, for Aquaculture System.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
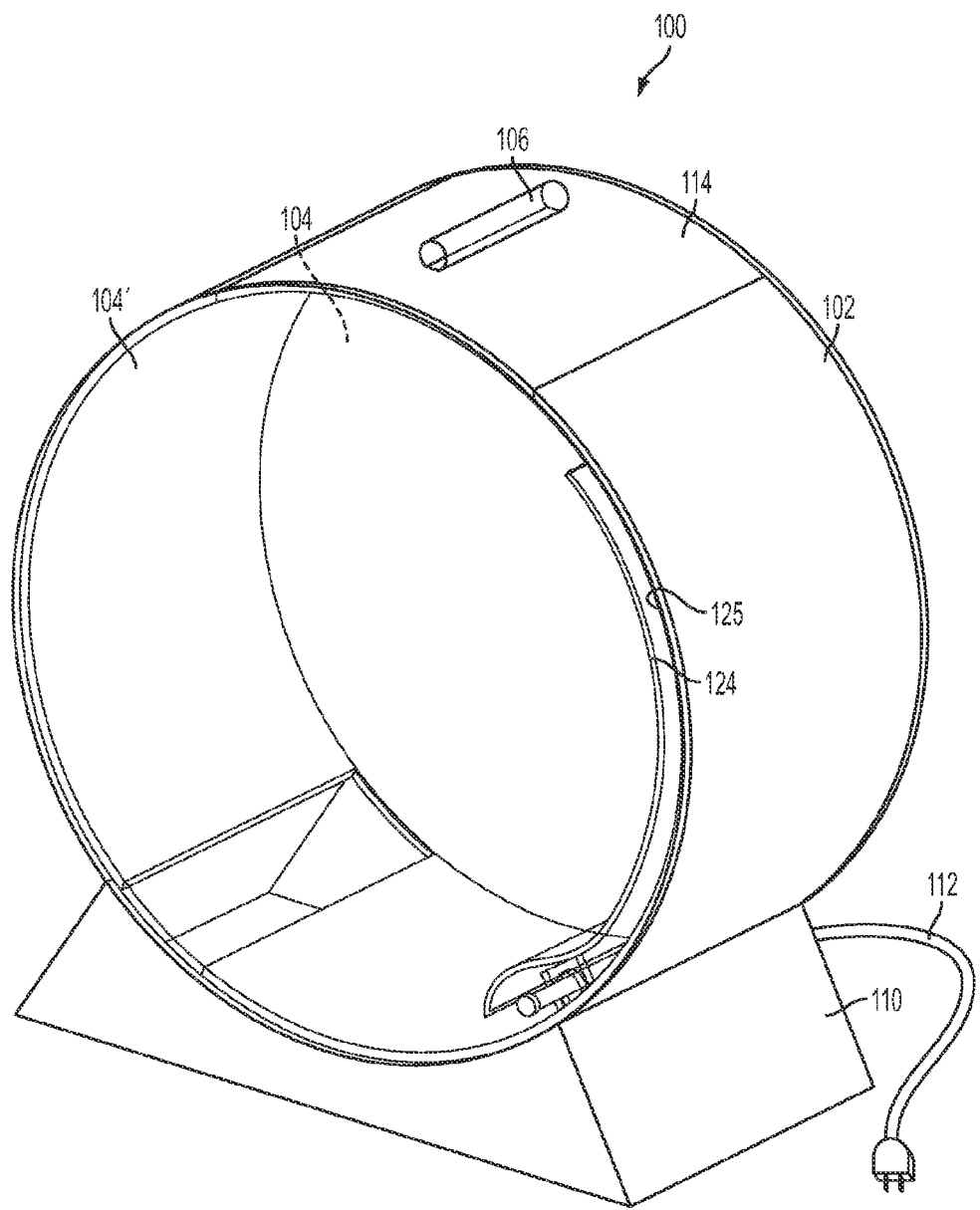
FIG. 1 is a perspective view of a tank.

FIG. 1 is a perspective view of a tank 100. As illustrated, the tank has a tubular 102 wall in a first dimension with flat or convex ends 104, 104'. The tank 100 is configurable such that it fits within or sits on a pedestal 110. In alternative configurations, the pedestal 110 and the tank 100 can be formed integrally such that they are formed from one piece or can be formed from separate pieces that are permanently or semi-permanently joined such that the pieces function as a single piece. In at least some configurations, one or both of the ends 104, 104' are formed from a transparent material. In other configurations, the tubular wall 102 is also transparent through all or a part of the wall.

The aquarium comprises: a water container or tank 100 having a first exterior wall 104 and a second exterior wall 104' parallel the first exterior wall and a panel or tubular wall 102 connecting the first exterior wall and the second exterior wall and defining an interior of the container; an interior wall 124 or chamber having an upper side and a lower side, an upper end and a lower end, a first side and a second side, wherein the first side of the interior wall is connected to the first exterior wall of the container and the second side of the interior wall is connected to the second exterior wall of the container, and further wherein the interior wall is positioned parallel at least a portion of the panel along at least a side of the exterior wall to form a channel therebetween; an air pump 126 positioned in communication with a lower end of the channel; and a power supply 112.

A power supply 112 is provided. The power supply 112, can be a cord with an AC adapter or any other suitable power source, such as a battery, solar cell, etc. A lid or handle 106 can be provided on an exterior surface of the device to provide a mechanism for a user to lift the entire tank or a lid 114 from the tank 100. An interior wall 124 can be provided which defines a bubble channel 125. The tank is configured to have an interior volume of from 1 to 100 gallons, or more. Desktop sized configurations typically have a volume of from 1-10 gallons, from 2-8 gallons, or 4-6 gallons. However, as will be appreciated by those skilled in the art, the size of the container can be changed without departing from the scope of the disclosure.

As will be appreciated by those skilled in the art, the bubble channel 125 is illustrated as being formed by an interior wall connected on one side to the first exterior wall and on a second side to the second exterior wall and which defines a gap therebetween through which bubbles can migrated in an upward motion. However, other configurations of channels can be used without departing from the scope of the disclosure. For example, a tubular apparatus could be formed in the interior of the tank along a wall.

Figure 2:
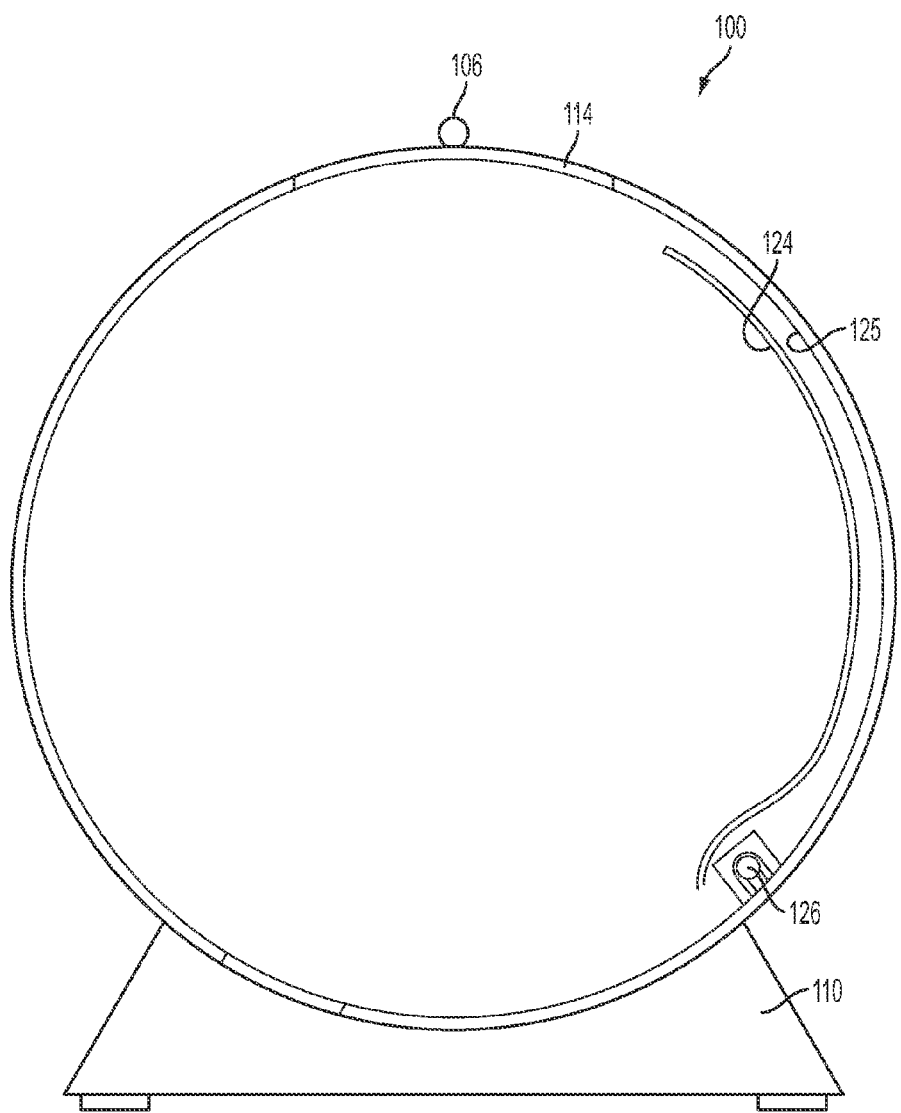
FIG. 2 is a front plan view of a tank.
Figure 3:
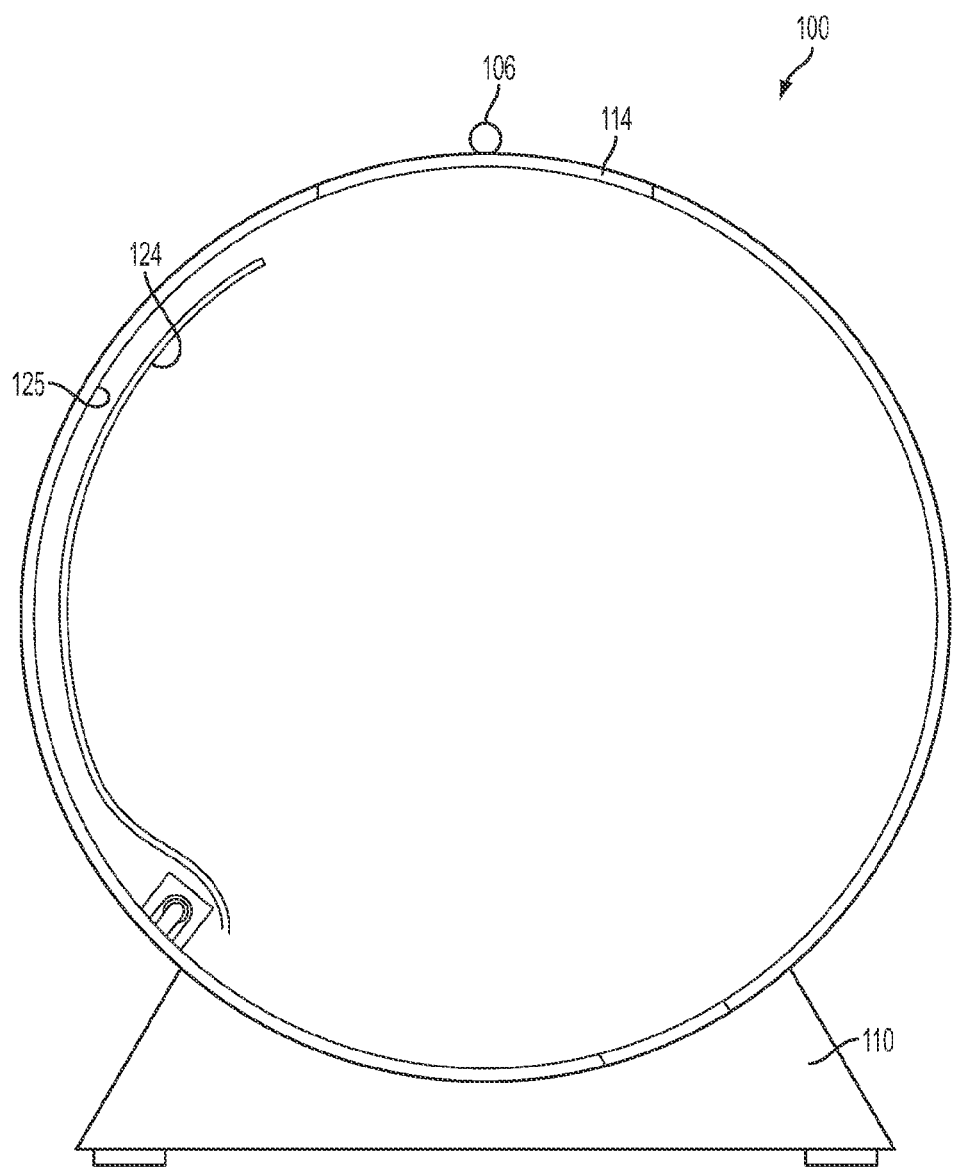
FIG. 3 is a is a rear plan view of a tank.

FIG. 2 is a front plan view of a jelly fish tank 100. From this perspective, the lid 114, and handle 106 can be seen, as well as the bubble channel 125 with its defining wall 124. An air pump 126 is also visible which is provided in communication with the bubble channel 125. The air pump 126 is also in electrical communication with a power source. FIG. 3 is a is a rear plan view of a jelly fish tank 100 illustrating the same features as were apparent in FIG. 2 from an opposite side.

The air pump 126 is typically positioned such that pump is positioned exterior to the tank. Air is pumped from the air into the bottom of the tank which then flows into the bubble channel. Because the air pump is an electrical component that would need to suck air from outside the tank, an efficient placement of the pump is outside the tank with the exhaust from the pump being communicated inside the tank. However, as will be appreciated by those skilled in the art, changing the location of the pump relative to the tank can occur without departing from the scope of the disclosure provided the pump is isolated from the water, can take in air on the one hand and exhaust air into the bubble chamber on the other hand.

Figures 4, 5:
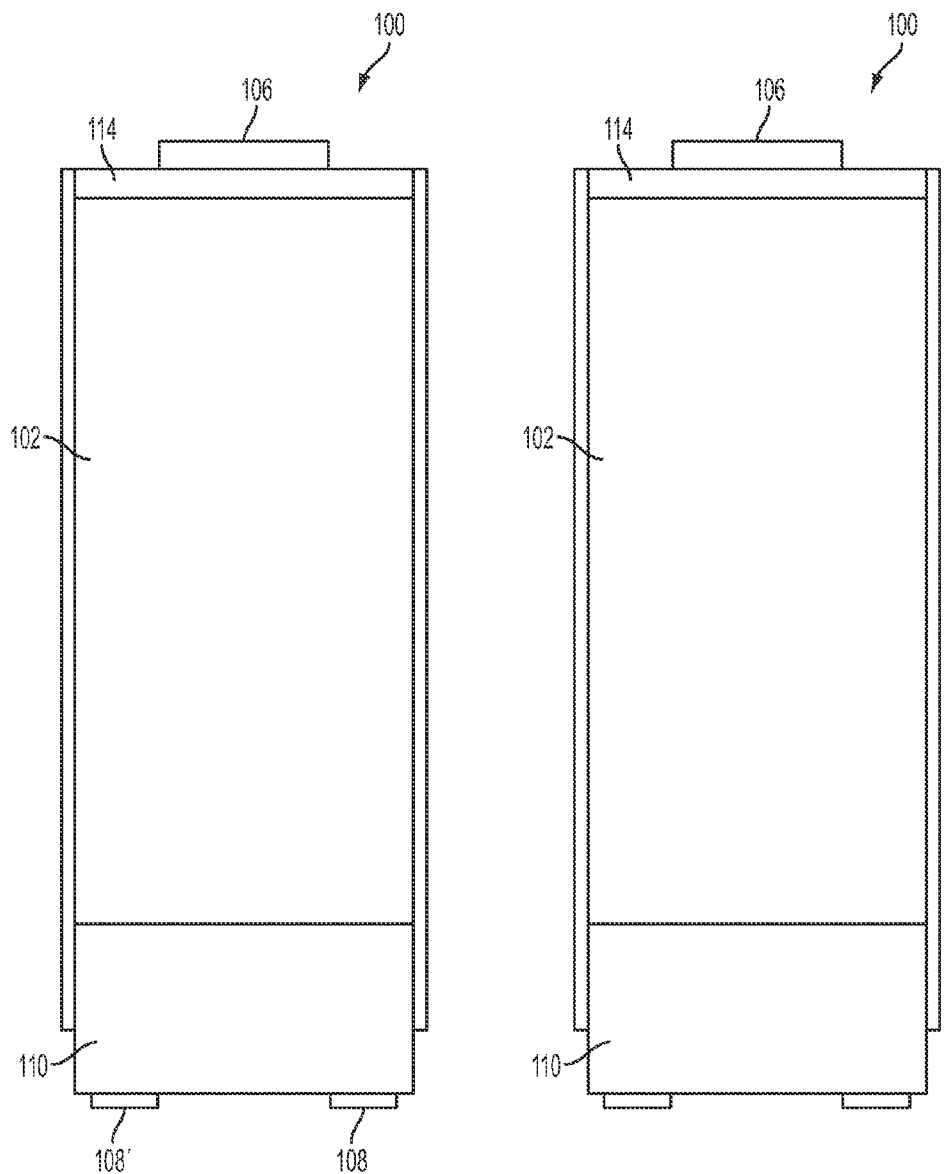
FIG. 4 is a right side plan view of a tank.
FIG. 5 is a left side plan view of a tank.

FIG. 4 is a right side plan view of a jelly fish tank 100; and FIG. 5 is a left side plan view of the jelly fish tank. From this view, the lid 114 and handle 106 are visible as is the base 110.

Figure 6:
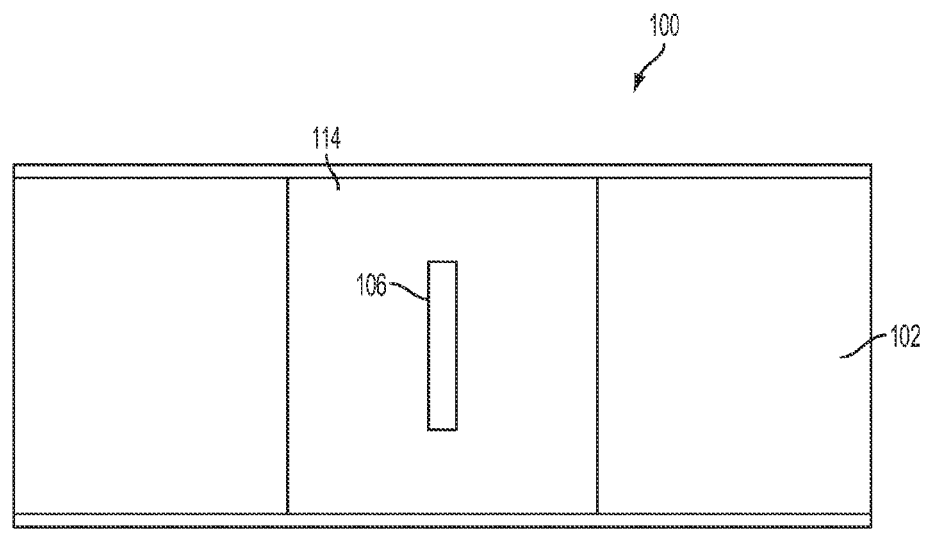
FIG. 6 is a top plan view of a tank.
Figure 7:
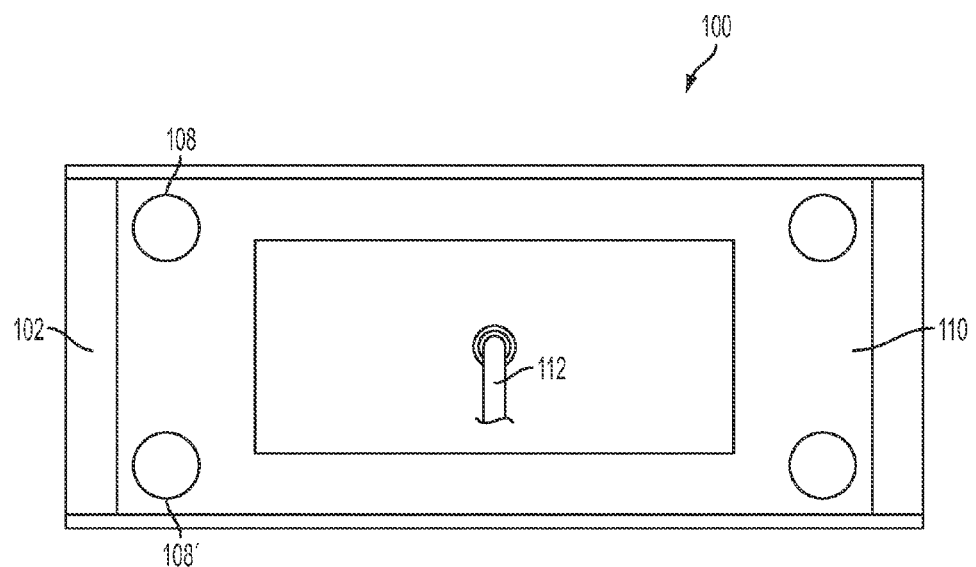
FIG. 7 is a bottom plan view of a tank.

FIG. 6 is a top plan view of a jelly fish tank 100; and FIG. 7 is a bottom plan view of a jellyfish tank. From the top plan view, the handle 106 and lid 114 are visible, as is the tubular side 102 of the tank. From the bottom plan view, the power cord 112 and feet 108, 108' are visible, as is the tubular side 102 of the tank.

Figure 8:
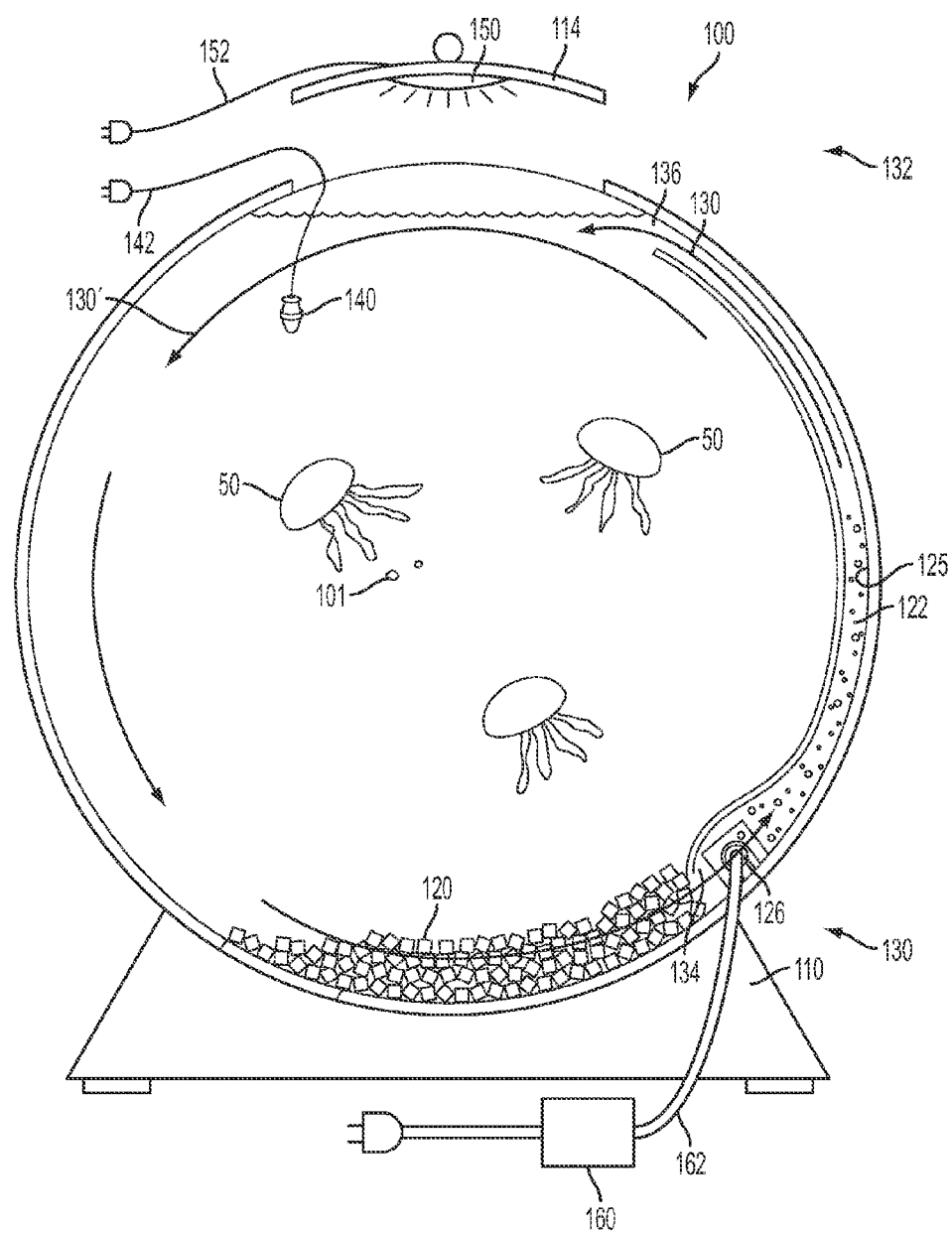
FIG. 8 is a side plan view of a tank which illustrates jelly fish therein, water flow, and a lighting mechanism.

FIG. 8 is a side plan view of a tank 100 which illustrates jelly fish 50 therein, water flow 130, and a lighting mechanism 150. An optional heater 140 can be provided as well.

The tank 100 has the general shape of a horizontal cylinder as illustrated. However, as will be appreciated by those skilled in the art, any shape adaptable to hold a rotating laminar flow could be used without departing from the scope of the disclosure. Additional shapes include, for example, an oval cross-section.

A front panel is typically clear so that users can see the jellyfish inside the tank. The back can be opaque or clear. In most configurations, the entire tank is watertight and the top 114 is removable for to provide access to the interior of the tank. A channel 122 is configured to extend from the bottom 130 of the tank 100 towards the top of the tank 132 along one side. The channel 122 is sealed at a front panel 102 of the tank and at a back panel 102' of the tank 100. The channel forms an opening at its upper end 136 and may be adapted to have an opening at its lower end 134. The channel 122 is adapted to transport or carry air bubbles that are pumped into the bottom of the tank within the channel 122 to the top of the tank.

As air bubbles flow through the channel 122, water is pulled through the bottom opening 134 of the channel 122 into the channel itself, flows 130 through the channel, and then exits the channel near the top of the tank 136. The water exits the channel in a flat laminar sheet and continues to flow 130' around the rounded edge of the aquarium. The resulting effect is a laminar sheet of water flowing all around the edges of the aquarium with the water in the middle of the tank 101 staying relatively still. In addition to providing aeration and water flow for filtration, the water flow pattern provides a bouyancy effect that keeps the jellyfish suspended towards the middle of the tank and away from the edges where the jellyfish could batter their delicate bodies against the wall of the aquarium. The jellyfish may engage the sides of the tank without detrimental effect. However, the air pump is configured and positioned such that the jellyfish do not get sucked into the bubble channel.

There are a variety of accessories that can be provided with this tank. An air pump 160 is required to produce the air bubbles necessary for the tank. Air from the air pump travels through a flexible line 162 into the tank near the bottom through a watertight bulkhead fitting. An air stone inside the tank breaks up the air into many tiny bubbles, which provides better aeration. A collection of filtration media 120 at the bottom of the tank is also typically provided. This media can provide mechanical, chemical and/or biological filtration as is required in all aquariums. Media is often made from a ceramic or natural material. Commercial examples, are aragonite sand (CaribSea, Inc., Fort Pierce, Fla.), Bio Modules (Rolf C. Hagen Inc., Montreal Canada, sold under the trade name AquaClear), Bio Balls (Pro Clear Aquatic Systems, Jacksonville, Fla.) and Substrat Pro (Eheim GmbH & Co KG, Deizisau, Germany). Before water is sucked into the bubble channel, the tank can be configured so that the water passes through this media and is filtered before entering the channel. Another accessory is lighting that can be placed either at the top of the tank where there is a lid, or at the bottom of the tank where it can shine through a clear part of the tank to light the inhabitants within. Lighting makes the inhabitants of the aquarium more attractive for viewers. Lights can either be colored lights or a single light with one or more color filters. Additionally, the light mechanism can be set-up so that the color of the light varies over time according to a sequence or as selected by the user.

Another accessory is a water heater 140, which can either be placed inside the tank submerged in water or on the outside of the tank heating the water through the wall of the aquarium. Conversely a water chiller can be used instead of a heater, although that is less common with most jellyfish species. One or more suitable power supplies can be included, such as an electrical power supply adapted to power the components of the tank that require power. The tank is configurable such that it sits on a stand.

The laminar flow pattern generated by the movement of air bubbles enables the jellyfish to remain suspended in the water. The flow provides an air-lift pump.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An aquarium comprising:
    a water container having a first exterior wall and a second exterior wall parallel the first exterior wall and a panel connecting the first exterior wall and the second exterior wall and defining an interior of the container;
    an interior wall having an upper side and a lower side, an upper end and a lower end, a first side and a second side, wherein the first side of the interior wall is connected to the first exterior wall of the container and the second side of the interior wall is connected to the second exterior wall of the container, and further wherein the interior wall is positioned parallel at least a portion of the panel along at least a side of the exterior wall to form a channel therebetween;
    an air pump positioned in communication with a lower end of the channel; and
    a power supply.
2. The aquarium of claim 1 further comprising a light.
3. The aquarium of claim 1 further comprising a filter.
4. The aquarium of claim 1 further comprising a filter media.
5. The aquarium of claim 1 further comprising a temperature controlling device.
6. The aquarium of claim 5 wherein the temperature controlling device is at least one of a heater and a cooler.
7. The aquarium of claim 1 further comprising a base.
8. The aquarium of claim 1 further comprising a lid.

9. The aquarium of claim 1 wherein the aquarium has a shape in two dimensions selected from round, oval, ovoid and elliptical.

10. A method for housing sea life comprising:
   placing a selected living organism in a water container having a first exterior wall and a second exterior wall parallel the first exterior wall and a panel connecting the first exterior wall and the second exterior wall and defining an interior of the container, an interior wall having an upper side and a lower side, an upper end and a lower end, a first side and a second side, wherein the first side of the interior wall is connected to the first exterior wall of the container and the second side of the interior wall is connected to the second exterior wall of the container, and further wherein the interior wall is positioned parallel at least a portion of the panel along at least a side of the exterior wall to form a channel therebetween, an air pump positioned in communication with a lower end of the channel and a power supply
   activating the air pump;
   generating a fluid flow within the channel at a first end of the channel that exits a second end of the channel;
   creating a laminar fluid flow of the fluid which maintains the sea life in a suspend position within the fluid.

11. The method of claim 10 further comprising activating a light to illuminate the interior of the container.

12. The method of claim 10 further comprising at least one of heating or cooling the fluid within the container.

13. The method of claim 10 further comprising the step of filtering the fluid through at least one of a filter and a filter media.

14. A kit comprising one or more of the following:
   a water container having a first exterior wall and a second exterior wall parallel the first exterior wall and a panel connecting the first exterior wall and the second exterior wall and defining an interior of the container, an interior wall having an upper side and a lower side, an upper end and a lower end, a first side and a second side, wherein the first side of the interior wall is connected to the first exterior wall of the container and the second side of the interior wall is connected to the second exterior wall of the container, and further wherein the interior wall is positioned parallel at least a portion of the panel along at least a side of the exterior wall to form a channel therebetween, an air pump positioned in communication with a lower end of the channel and a power supply;
   one or more lights;
   one or more colored filters;
   one or more filters;
   one or more filter media;
   one or more temperature controlling devices.

* * * * *